UNITED STATES PATENT OFFICE.

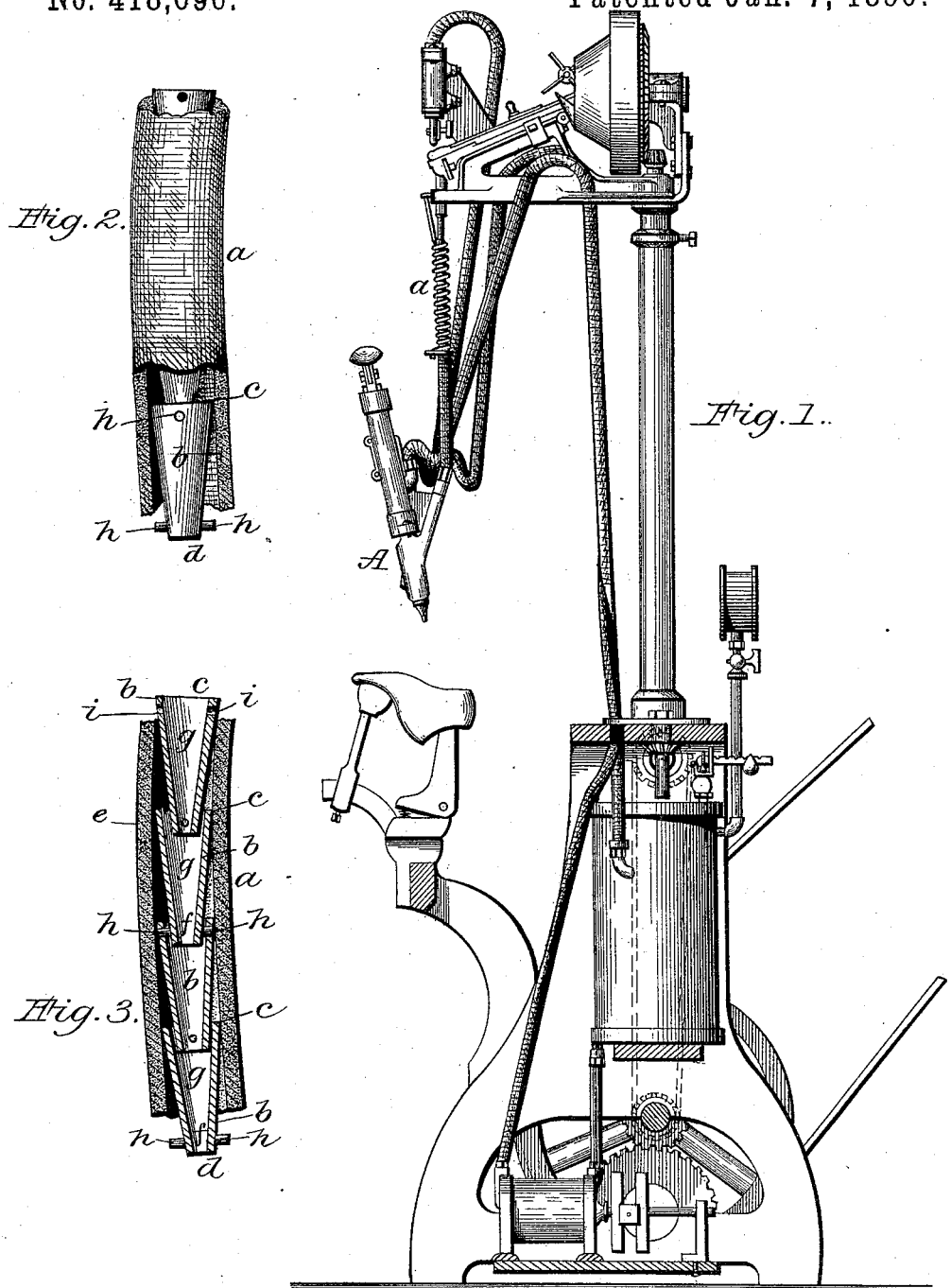

HENRY W. DEAN, OF NORRISTOWN, ASSIGNOR OF PART TO JOHN MUNDELL, OF PHILADELPHIA, PENNSYLVANIA, SIMON A. BUTLER, OF BOSTON, AND EMMA F. LOTHROP AND JOSEPH HERBERT BOWEN, BOTH OF LYNN, MASSACHUSETTS.

TACK-FEEDING TUBE.

SPECIFICATION forming part of Letters Patent No. 418,696, dated January 7, 1890.

Application filed May 1, 1889. Serial No. 309,263. (No model.)

*To all whom it may concern:*

Be it known that I, HENRY WELLINGTON DEAN, a citizen of the United States, residing at Norristown, in the county of Montgomery and State of Pennsylvania, have invented new and useful Improvements in Flexible Tack-Feeding Tubes, of which the following is a specification.

My improvement is directed to a novel construction of tack-feeding tubes for tacking-machines, whereby all danger of the tacks catching and clogging the passage will be prevented and the tube rendered flexible within certain limits in the operation of driving the tacks delivered by said tube to the driver. In effecting these objects I provide a rubber tube with a metallic lining composed of tubular sections of conical or tapering form, both exteriorly and interiorly, each alternate section being pivotally connected at right angles to permit the flexing of the tube in any direction within certain limits. This construction provides a contracted and an enlarged passage at the joining ends of the section for the purpose of centering and giving a perfectly free course to the tacks through the tube under all conditions of its use and flexure. By this construction a tack in passing the joint when the tube is flexed will have its head centered in the contracted end of the passage in one section and its point in the enlarged end of the passage in the other section, and will be thereby centered in the passage and prevented from catching and clogging the passage.

The specific features of novelty are shown in the accompanying drawings, and will be particularly set forth in the claims concluding this specification.

In the drawings furnished and forming part of the specification I have illustrated my improved tack-feeding tube in connection with a driver-head controlled in the hands of the operator for free movement, and it will be understood that in such illustration the driver-head is suspended by the said flexible feed-tube from a machine which supports the tack-supplying devices and the appliances for operating the driver by compressed air, which may be of any suitable construction. The devices and appliances shown for this purpose are of the character illustrated and described in a patent granted to me April 3, 1888, for a nailing-machine, in which a universally-movable tack-driving head is suspended by a flexible tack-feeding tube, and has its driver operated by compressed air.

In the drawings furnished, and forming part of this specification, Figure 1 shows in elevation the complete machine in connection with an ordinary last-supporting jack. Fig. 2 is a portion of the feeding-tube enlarged, with the rubber covering partially removed. Fig. 3 is a longitudinal section of a portion of the metal tube bent or flexed, as will occur in the free movement of the driver-head in practical use.

A denotes such a tack-driving head as is described and shown in my said patent, and which in use is connected to the raceway of the tack-supplying hopper and suspended therefrom by flexible tubes, one of which is the tack-feeding tube, which forms a continuous passage from said raceway to the tack-passage in the head, wherein the driver-pin is operated by compressed air. This tube *a* is preferably of rubber, and its lining consists of tubular metal sections *b*, preferably of equal length, about an inch in length and of a diameter at its largest end *c* to fit within the rubber tube. These sections taper from end to end, the interior diameter of the small end *d* being about one-third less than the diameter of its largest end. These tubular sections are coupled with the small end of one section, extending within the large end of the other section, but not with a close joining, so that the small end of one section of the tube will have a free space *e* surrounding it for free lateral play within certain limits within the large end of the next coupled section of the tube for the purpose of rendering the tube flexible, and provide a narrow passage *f* merging into a larger passage *g* at the coupling, so as to give a free way to the tack at this point.

In the use of the tube the large ends c of the conic sections stand toward the tack-supplying device, so that the small ends d of the sections deliver the tacks centered point foremost into the large ends of the sections, and the sectional conduit is thus formed so that the tacks can have no point of lodgment in their passage to the driver. By reason of this construction the tacks in passing the joint when the tube is flexed will have ample room to turn the bend, and cannot be wedged or bound however quickly the tube may be flexed.

A simple means of coupling the sections so that they will have freedom for flexure and prevent their separation is by pivot-pins h h extending at right angles to the axis of the tube from its small end and entering registering holes i i in the large end of the next section. To give freedom to the tube to flex in any direction, these coupling pivot-pins are arranged at right angles to each other in alternate sections. The conic sections are preferably cast with thin walls and the pins integral, and they are coupled by slightly flattening their large ends, so as to increase their width in the line of the openings to receive the pins. The end of the section is then contracted to a uniform size to confine the pins in the holes. This construction gives an air-tight tack-passage narrow at certain points and widening therefrom, with a joint capable of flexing within limits which prevent the joint from opening. This limit of flexure is produced by the pin-coupling and the relative size of the coupled ends of the sections.

While I have described and illustrated my improved tack-feeding tube in connection with lasting-shoes, it is obvious that it may be used for other work—such, for instance, as nailing on the tops of cigar-boxes. It is also obvious that the coupled metallic conic sections may be employed as a tack-feeding tube without the air-tight inclosing-tube—as, for instance, when feeding tacks to a tacking-machine operated otherwise than by compressed air. I have drawn the metallic connected sections into the tube by a wire first connected to the small end of the end section and then passed through the tube and holding the inclosing-tube in my hand while pulling upon the wire, and I prefer this way for short lengths of tubes. The inclosing-tube is properly connected at each end with its operating parts.

I claim as my improvement—

1. A flexible metallic tack-feeding tube composed of sections tapering from end to end, each alternate section being pivotally connected at right angles to each other to permit lateral flexure within certain limits, substantially as described, for the purpose specified.

2. The combination of an air-tight flexible tube with a flexible metallic tack-feeding conduit composed of sections tapering from end to end, each alternate section being pivotally connected at right angles to each other to permit lateral flexure within certain limits, substantially as described, for the purpose specified.

In testimony whereof I have hereunto set my hand in the presence of two subscribing witnesses.

HENRY W. DEAN.

Witnesses:
 A. E. H. JOHNSON,
 JAMES MUNDELL.